(12) United States Patent
Weng

(10) Patent No.: US 7,154,469 B2
(45) Date of Patent: *Dec. 26, 2006

(54) BACKLIGHT DEVICE

(75) Inventor: Der-Chin Weng, Taipei (TW)

(73) Assignee: Acer Communications and Multimedia Inc., Taoyuan (TW)

( * ) Notice: Subject to any disclaimer, the term of this patent is extended or adjusted under 35 U.S.C. 154(b) by 103 days.

This patent is subject to a terminal disclaimer.

(21) Appl. No.: 10/846,080

(22) Filed: May 14, 2004

(65) Prior Publication Data

US 2004/0212581 A1    Oct. 28, 2004

Related U.S. Application Data

(62) Division of application No. 09/793,460, filed on Feb. 26, 2001, now Pat. No. 6,801,184.

(30) Foreign Application Priority Data

Jul. 6, 2000    (TW) ................ 89113372 A

(51) Int. Cl.
    *G09G 3/36*    (2006.01)
(52) U.S. Cl. .................... 345/102; 345/87
(58) Field of Classification Search ........ 345/87–90, 345/92, 100–104, 98, 99, 214, 204–206, 345/96; 349/61, 62, 69–71
See application file for complete search history.

(56) References Cited

U.S. PATENT DOCUMENTS

| | | | |
|---|---|---|---|
| 5,153,754 A * | 10/1992 | Whetten | 349/147 |
| 5,237,439 A | 8/1993 | Misono et al. | 359/74 |
| 5,613,751 A | 3/1997 | Parker et al. | 362/31 |
| 5,953,089 A | 9/1999 | Hiji et al. | 349/112 |
| 6,076,932 A * | 6/2000 | Uchida et al. | 359/614 |
| 6,128,057 A * | 10/2000 | Suzuki et al. | 349/110 |
| 6,151,089 A | 11/2000 | Yang et al. | 349/113 |
| 6,242,860 B1 | 6/2001 | Sasao et al. | 313/586 |

FOREIGN PATENT DOCUMENTS

| | | |
|---|---|---|
| CN | 2273869 Y | 2/1998 |
| CN | 2336378 Y | 9/1999 |

* cited by examiner

*Primary Examiner*—Richard Hjerpe
*Assistant Examiner*—Mansour M. Said
(74) *Attorney, Agent, or Firm*—Ladas & Parry LLP

(57) ABSTRACT

A backlight device that includes a transparent substrate, a plurality of protrusions, a first layer of transparent material, a second layer of transparent material and a light source. The protrusions are provided on the substrate. The first layer of transparent material is attached to the substrate. Also, the first layer of transparent material has an index of refraction smaller than the substrate. The second layer of transparent material is attached to the first layer of transparent material, while the second layer of transparent material has particles inside. The light source emits light. The light is scattered by the protrusions, propagates through the substrate and the first layer of material, propagates into the second layer of material, is scattered by the particles of the second layer of material, and then propagates out from the backlight device.

9 Claims, 3 Drawing Sheets

BACKLIGHT DEVICE

CROSS-REFERENCE TO RELATED APPLICATIONS

This patent application is a divisional application of U.S. Ser. No. 09/793,460, filed on Feb. 26, 2001 now U.S. Pat. No. 6,801,184, which claims priority to Taiwanese Application No. 89113372, filed on Jul. 6, 2000.

BACKGROUND OF THE INVENTION

1. Field of the Invention

The present invention relates in general to a backlight device having a pre-combined diffuser and substrate, thereby simplifying the process of assembling the backlight device in a LCD and scanner factory.

2. Description of the Related Art

Referring to FIG. 1, a conventional backlight device for a liquid crystal display (LCD) or a scanner includes a tubular lamp 11, a lighting guide 16 and a diffuser 15. The tubular lamp 11 emits light, and the light propagates in the lighting guide 16 and propagates out from the diffuser 15.

The lighting guide 16 includes a transparent substrate 14 and a white reflection sheet 12. A plurality of protrusions 13 are provided on the substrate 14 to scatter the light propagating in the substrate 14. The diffuser 15 is used for further scattering the light so that the distribution of the light out from the diffuser 15 is more uniform. If no diffuser is provided, the images of the protrusions 13 can be observed by the user in front of the backlight device.

Referring to FIG. 2, the light propagates in the transparent substrate 14 in two paths, indicated by reference numerals 17 and 18: (1) Light 17 is scattered by the protrusions 13 and then reflected by the reflection sheet 12 back to the substrate 14. Alternatively, light 17 is directly reflected at the interface between the protrusions 13 and the substrate 14. In either situation, light 17 is finally reflected back to the substrate 14. A large part of light 17 has a small angle of incidence, thus goes through the interface 19 and propagates out from the diffuser 15. A small part of light 17 has a large angle of incidence and is reflected at the interface 19 back to the substrate 14. (2) Light 18 directly propagates toward the interface 19. The light 18 has a large angle of incidence and is totally reflected at the interface 19.

In conclusion, the light reflected at the interface 19 including a small part of light 17 and the whole of light 18. The light reflected at the interface 19 is scattered by the protrusions 13, propagates through the substrate 14 and then propagates out from the diffuser 15.

It is noted that the light 18 does not propagate toward the protrusions 13 at the beginning. However, the light 18 is totally reflected at the interface 19 back to the substrate 14 and then is scattered by the protrusions 13. It is therefore understood that the light 17 and 18, which propagate in different paths, is scattered by the protrusions 13.

The diffuser 15 and the substrate 14 of the conventional backlight device are two separate elements. The LCD or scanner manufacturers need to buy the two elements separately from the suppliers and assemble them in the factories.

SUMMARY OF THE INVENTION

An object of the present invention is to provide a backlight device having a pre-combined diffuser and substrate, thereby simplifying the process of assembling the backlight device in a LCD and scanner factory.

The backlight device of the present invention includes a transparent substrate, a plurality of protrusions, a first layer of transparent material, a second layer of transparent material and a light source. The protrusions are provided on the substrate. The first layer of transparent material is attached to the substrate. Also, the first layer of transparent material has an index of refraction smaller than the substrate. The second layer of transparent material is attached to the first layer of transparent material, while the second layer of transparent material has particles inside. The light source emits light. The light is scattered by the protrusions, propagates through the substrate and the first layer of material, propagates into the second layer of material, is scattered by the particles of the second layer of material, and then propagates out from the backlight device It is noted that the second layer of material, functioning the same as the conventional diffuser, is combined with the substrate via the first layer of material. Therefore, the process of assembling the backlight device in a LCD and scanner factory is simplified.

Alternatively, the backlight device of the present invention includes a transparent substrate, a plurality of protrusions, a layer of transparent material and a light source. The protrusions are provided on the substrate. The layer of transparent material has an index of refraction smaller than the substrate and has a first surface and a second surface, wherein the first surface is attached to the substrate and the second surface is made rough. The light source emits light. The light is scattered by the plurality of protrusions, propagates through the substrate into the layer of material, is scattered by the second surface, and propagates out from the backlight device.

It is noted that the layer of transparent material is directly attached to the substrate and the second surface of the layer of transparent material functions the same as the conventional diffuser. By such an arrangement, the process of assembling the backlight device in a LCD and scanner factory is simplified.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
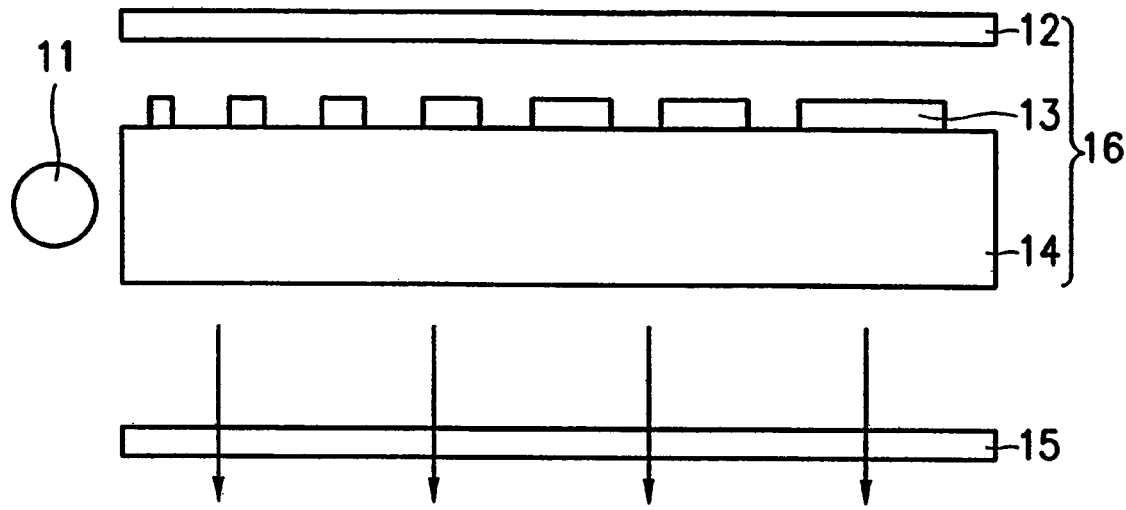
FIG. 1 depicts an arrangement of the elements of a conventional backlight device for a scanner or a liquid crystal display.
Figure 2:
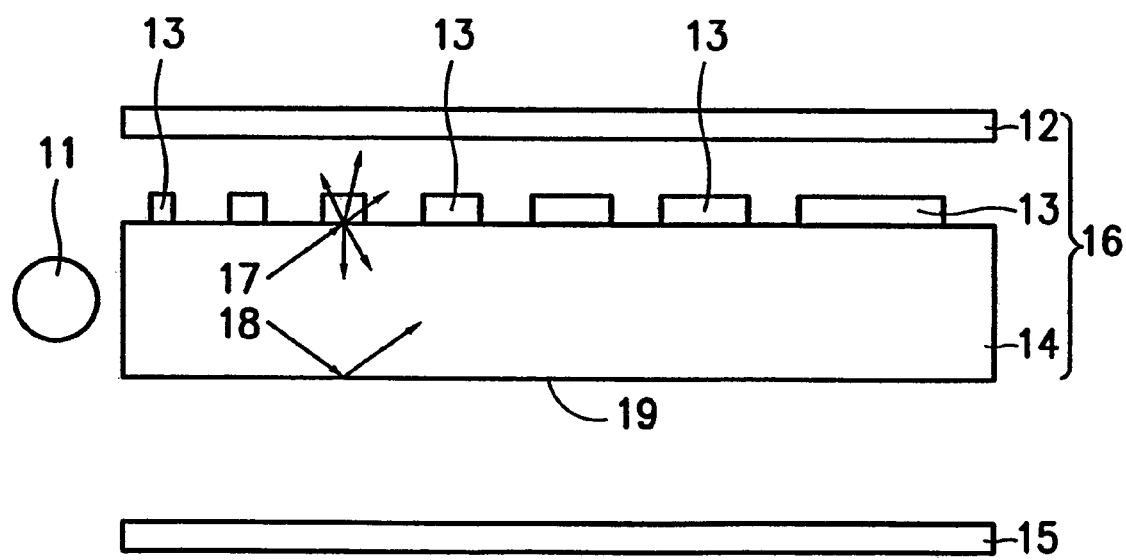
FIG. 2 depicts the propagating paths of the light in the conventional backlight device.
Figure 3:
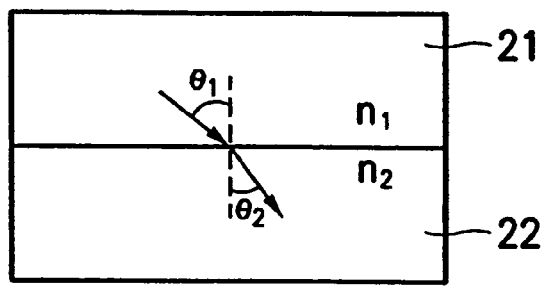
FIG. 3 depicts the propagating way of light in different materials.

As mentioned above, the light 18 (FIG. 2) does not propagate toward the protrusions 13 at the beginning. However, the light 18 is totally reflected back to the substrate 14 at the interface 19 so that the light 18 is scattered by the protrusions 13 afterwards. It is included that all the light 17, 18 is scattered by the protrusions 13. This guarantees that the light emitted from the backlight device is uniform. Therefore, keeping the total reflection of the light 18 at the interface 19 is very important. The condition of the total reflection is now discussed:

Referring to FIG. 3, a light propagates in two layers of different materials 21, 22. The material 21 has an index of refraction $n_1$, while the material 22 has an index of refraction $n_2$. The angle of incidence for the light is $\theta_1$. The angle of emergence for the light is $\theta_2$. In accordance with Snell's Law, we obtain:

$$n_1 \sin \theta_1 = n_2 \sin \theta_2 \quad (1)$$

When the light is totally reflected, $\sin \eta_2 = 1$. Then, $$\sin \theta_1 = n_2/n_1 \quad (2)$$

Also, $\sin \theta_1$ is always smaller than 1. That is, $\sin \theta_1 < 1$. Therefore, we obtain:

$$n_1 > n_2 \quad (3)$$

It is therefore understood that the light is totally reflected only if $n_1 > n_2$. On the other hand, no total reflection can be obtained if $n_2 > n_1$.

Figure 4:
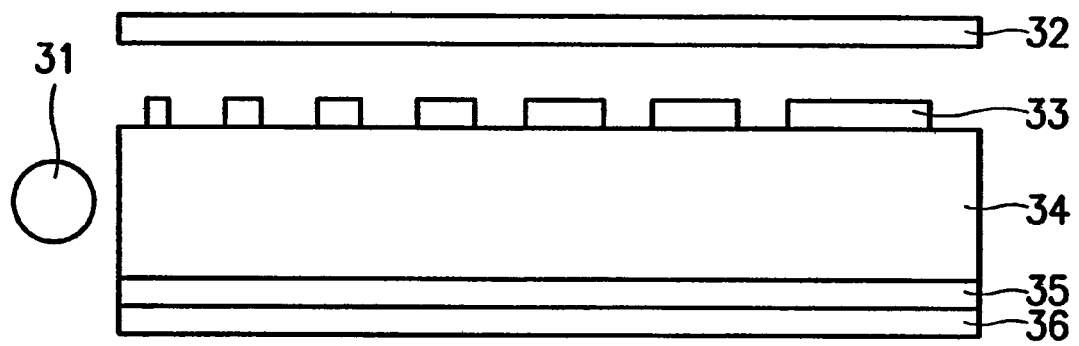
FIG. 4 depicts a backlight device in accordance with a first embodiment of the present invention.

The purpose of the present invention is to simplify the process of assembling the backlight devices in LCD or scanner factories. To achieve such a purpose, the diffuser and the substrate are pre-combined in the manufacturing process, which proceeds before the backlight device is assembled in the LCD or scanner factory. The diffuser and the substrate are combined in accordance with the above-mentioned equation (3) so that the light is surely scattered by the protrusions 13 before propagating out from the substrate 14. Then, the light emitted from the backlight device is uniform. Referring to FIG. 4, a backlight device of a first embodiment of the present invention includes a tubular lamp 31, a white reflection sheet 32, a transparent substrate 34, a first layer of transparent material 35 and a second layer of transparent material 36. Light is emitted from the tubular lamp 31, propagates through the substrate 34 and the first layer of material 35 and then propagates out from the second layer of material 36. A plurality of protrusions 33 are provided on the substrate 34 to scatter the light. The first layer of material 35 is attached to the bottom of the substrate 34 and has an index of refraction smaller than the substrate 34 to satisfy equation (3) The second layer of material 36 is attached to the bottom of the first layer of material 35. Also, the second layer of material 36 contains transparent or non-transparent tiny particles of diameters smaller than 10 μm to function the same as the conventional diffuser for further scattering the light. The tiny particles are made of, for example, $TiO_2$ or $SiO_2$.

Figure 5:
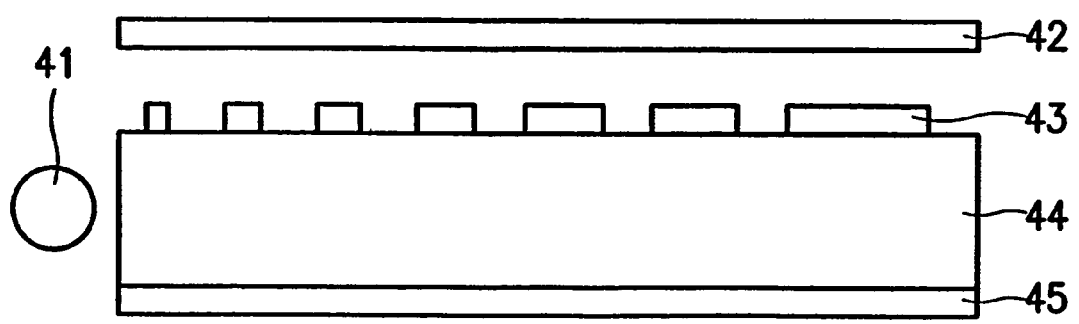
FIG. 5 depicts a backlight device in accordance with a second embodiment of the present invention.

Referring to FIG. 5, a backlight device of a second embodiment of the present invention includes a tubular lamp 41, a white reflection sheet 42, a transparent substrate 44 and a layer of transparent material 45. Light is emitted from the tubular lamp 41, propagates through the substrate 44 and then propagates out from the layer of material 45. A plurality of protrusions 43 are provided on the substrate 44 to scatter the light. The layer of material 45 is attached to the bottom of the substrate 44 and has an index of refraction smaller than the substrate 44 to satisfy equation (3). Also, the bottom surface of the transparent layer 45 is made rough like that of ground glass. Then, the layer of material 45 functions the same as the conventional diffuser for scattering the light.

In conclusion, the present invention pre-combines the diffuser and the substrate to simplify the process of assembling the backlight device in the LCD or scanner factory. When the diffuser 36 has an index of refraction larger than the substrate 34, the first embodiment is adopted. Wherein the transparent layer of material 35 is sandwiched between the diffuser 36 and the substrate 34, and the transparent layer of material 35 has an index of refraction smaller than the substrate 34 to satisfy equation (3). On the other hand, the second embodiment is adopted when the diffuser has an index of refraction smaller than the substrate, wherein the diffuser 45 is directly attached to the substrate 44.

Figure 6:
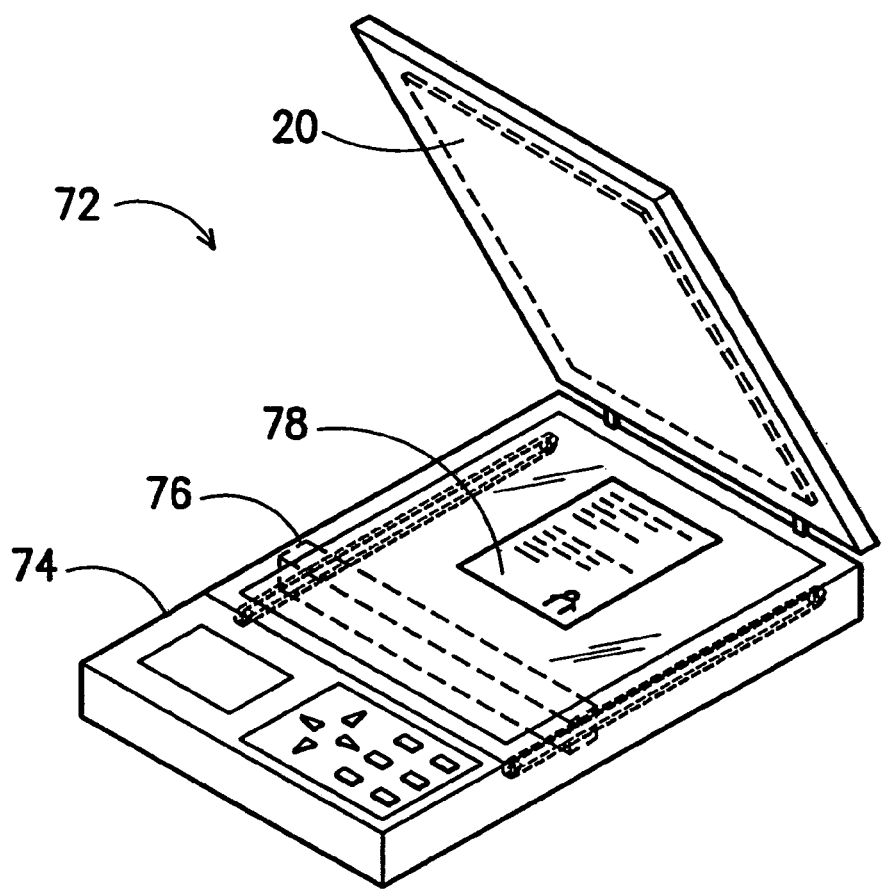
FIG. 6 depicts a scanner provided with a backlight device of the present invention.

FIG. 6 depicts a scanner provided with a backlight device of the present invention, wherein the scanner 72 includes a housing 74, a scanning module 76 disposed in the housing 74 for scanning a transparent document 78, and a backlight device 20 connected to the housing 74 to provide light. The backlight device 20 is disclosed in the above first and second embodiments.

Figure 7:
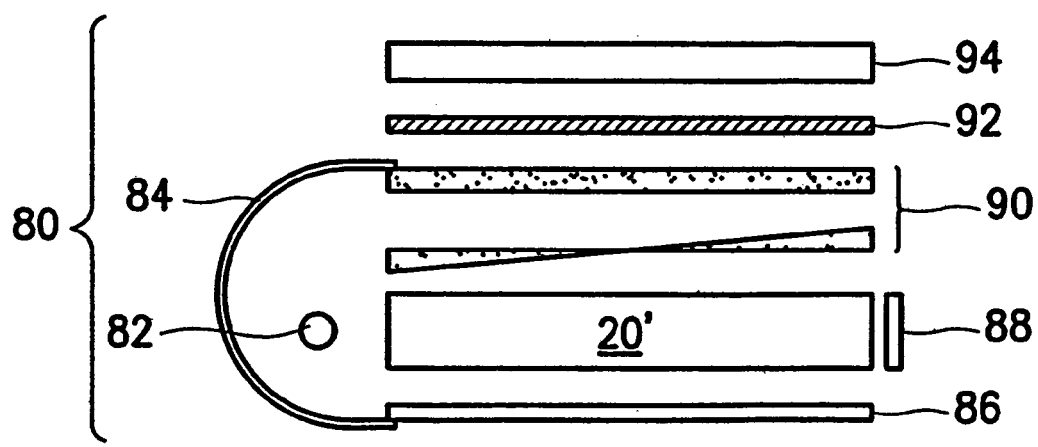
FIG. 7 depicts a liquid crystal display provided with a backlight device of the present invention.

FIG. 7 depicts a liquid crystal display (LCD) provided with a backlight device of the present invention. The liquid crystal display includes a tubular lamp 82, a plurality of reflection sheets 84, 86, 88, a module 20', a set of diffusers 90, a polarizer 92 and a LCD panel 94. The module 20' is the combined substrate 34 and material 35, 36 in the first embodiment, or is the combined substrate 44 and material 45 in the second embodiment. The tubular lamp 82 emits light. The light directly propagates into the module 20' or is reflected by the reflection sheets 84, 86, 88 to the module 20'. The module 20' unifies the distribution of the light, the diffusers 90 further unify the distribution of the light, and the polarizer 92 unifies the polarization of the light. The LCD panel 94 contains a plurality of tiny liquid crystal units. The liquid crystal units are used for adjusting the light to show pictures on the LCD panel 94.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight device, including:
   a transparent substrate;
   a plurality of protrusions provided on the substrate;
   a first layer of transparent material attached to the substrate, the first layer of transparent material having an index of refraction smaller than the substrate;
   a second layer of transparent material attached to the first layer of transparent material, the second layer of transparent material having particles inside; and
   a light source for emitting light, which is scattered by the plurality of protrusions, propagates through the substrate and the first layer of material, propagates into the second layer of material, is scattered by the particles of the second layer of material, and then propagates out from the backlight device.

2. A backlight device as claimed in claim 1, wherein the particles are made of $TiO_2$.

3. A backlight device as claimed in claim 1, wherein the particles have diameters smaller than 10 μm, and the particles are made of such material that the light fails to propagate through the particles.

4. A backlight device as claimed in claim 1, wherein the particles are made of $SiO_2$.

5. A backlight device as claimed in claim 1, wherein the particles have diameters smaller than 10 μm, and the particles are transparent.

6. The backlight device as claimed in claim 1, wherein the second layer of transparent material contacts the first layer of transparent material.

7. The backlight device as claimed in claim 1, wherein the transparent substrate has opposing major surfaces, the plurality of protrusions being disposed on a first opposing major surface of the transparent substrate and first layer of transparent material being attached to a second opposing major surface of the transparent substrate.

8. A backlight device, including:
   a transparent substrate;
   a plurality of protrusions provided on the substrate; a layer of transparent material having an index of refraction smaller than the substrate and having a first surface and a second surface, wherein the first surface is attached to the substrate and the second surface is made rough;
   a light source for emitting light, which is scattered by the plurality of protrusions, propagates through the substrate into the layer of material, is scattered by the second surface, and propagates out from the backlight device.

9. The backlight device as claimed in claim 8, wherein the transparent substrate has opposing major surfaces, the plurality of protrusions being disposed on a first opposing major surface of the transparent substrate and first layer of transparent material being attached to a second opposing major surface of the transparent substrate.

* * * * *

UNITED STATES PATENT AND TRADEMARK OFFICE
CERTIFICATE OF CORRECTION

PATENT NO. : 7,154,469 B2 Page 1 of 1
APPLICATION NO. : 10/846080
DATED : December 26, 2006
INVENTOR(S) : Der-Chin Weng It is certified that error appears in the above-identified patent and that said Letters Patent is hereby corrected as shown below:

Item (73) On Title Page should read:
BENQ Corporåtion, Taoyuan (TW)

Signed and Sealed this

First Day of May, 2007

JON W. DUDAS
*Director of the United States Patent and Trademark Office*